(12) United States Patent
Rittner et al.

(10) Patent No.: US 7,357,011 B2
(45) Date of Patent: Apr. 15, 2008

(54) METHOD AND APPARATUS FOR MANUFACTURING METAL STRIPS

(75) Inventors: Karl Rittner, Hilden (DE); Sitki Altuntop, Duisburg (DE); Frank Benfer, Bad Laasphe (DE); Carsten Lippold, Düsseldorf (DE)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 10/580,790

(22) PCT Filed: Jul. 8, 2005

(86) PCT No.: PCT/EP2005/007378

§ 371 (c)(1),
(2), (4) Date: May 26, 2006

(87) PCT Pub. No.: WO2006/021263

PCT Pub. Date: Mar. 2, 2006

(65) Prior Publication Data

US 2007/0113610 A1    May 24, 2007

(30) Foreign Application Priority Data

Aug. 24, 2004  (DE) .................... 10 2004 040 927

(51) Int. Cl.
*B21B 1/46*     (2006.01)
*B21B 45/04*    (2006.01)

(52) U.S. Cl. ........................... 72/200; 72/202; 72/236; 72/39; 72/40; 266/135; 29/81.01

(58) Field of Classification Search ..................... None
See application file for complete search history.

(56) References Cited

U.S. PATENT DOCUMENTS 5,542,165 A * 8/1996 Coassin et al. ............. 29/33 C
5,708,678 A * 1/1998 Fasoli et al. ................ 373/110
5,934,356 A * 8/1999 Di Paolo et al. ........... 164/263

FOREIGN PATENT DOCUMENTS

DE          40 17 928         12/1991

(Continued)

OTHER PUBLICATIONS

Patent Abstracts of Japan, Bd. 015, No. 484 (C-0892), Dec. 9, 1991 & JP 03 211233 A (Nippon Steel Corp), Sep. 17, 1991.

*Primary Examiner*—Dmitry Suhol
(74) *Attorney, Agent, or Firm*—Friedrich Kueffner

(57) ABSTRACT

The invention concerns a method for producing metal strip (1) in an installation (2), in which a metal strand, especially a thin slab, is brought to a desired temperature and/or is maintained at a desired temperature in a furnace (3, 3a, 3b) and is subjected to a rolling process in a rolling train (4) downstream of the furnace (3, 3a, 3b) in the direction of conveyance (R) of the metal strand (1). In accordance with the invention, to prevent the formation of scale deposits in the downstream region of the furnace, provision is made for the metal strand (1) to be subjected to at least one descaling operation during its residence time in the region (5) of the furnace (3, 3a, 3b). In addition, the invention concerns an installation for producing metal strip.

9 Claims, 2 Drawing Sheets

FOREIGN PATENT DOCUMENTS

| | | |
|---|---|---|
| DE | 41 37 547 | 5/1993 |
| DE | 195 24 082 | 1/1997 |
| DE | 100 04 117 | 8/2001 |
| EP | 0 625 383 | 11/1994 |
| EP | 0 770 433 | 5/1997 |
| EP | 0 795 361 | 9/1997 |
| EP | 0 846 508 | 6/1998 |
| WO | 03/064069 | 8/2003 |

* cited by examiner

METHOD AND APPARATUS FOR MANUFACTURING METAL STRIPS

The invention concerns a method for producing metal strip in an installation, in which a metal strand, especially a thin slab, is brought to a desired temperature and/or is maintained at a desired temperature in a furnace and is subjected to a rolling process in a rolling train downstream of the furnace in the direction of conveyance of the metal strand, wherein the metal strand is subjected to at least one descaling operation during its residence time in the furnace. The invention also concerns an installation for producing metal strip.

Methods and installations of this general type have already been described in JP 03-211,233 A, EP 0 625 383 A, WO 03/064069 A, EP 0 795 361 A, and EP 0 770 433 A. These documents provide for descaling means in or on the furnace for descaling the metal strip that is to be processed.

Similar types of methods and installations are also disclosed in other prior-art documents. EP 0 327 854 B1 discloses a method in which prestrip that has been cast in a strip casting installation is rolled in a hot wide-strip finishing train. In this method, the cast prestrip is brought to rolling temperature in a continuous operation and fed into the finishing train to be rolled out. To expand the production program of the installation, the prestrip is rolled to plate thickness in the finishing train as an alternative to hot strip rolling, and the plate is cooled, cut to plate lengths, and stacked.

DE 41 37 547 C2 discloses a continuous furnace for heating thin slabs, which consists of two parallel furnace sections, into which the slabs cast from at least two cast strands enter after they have been separated from the strands, such that the axis of motion of one entry section coincides with the axis of motion of the rolling train downstream of the continuous furnace in the technological flow. These entry sections are followed by at least one furnace section in the form of a transverse conveyor that can be moved transversely to the technological flow of the slabs in order, if necessary, to move the slabs into the axis of motion of the rolling train. DE 40 17 928 A1 discloses a similar solution, in which a furnace section designed as a transverse conveyor is likewise used. DE 195 24 082 B4 also discloses an installation for producing hot-rolled steel strip in a production line comprising a continuous slab casting installation, cut-to-length shears, a continuous furnace, and a hot finishing train. The continuous furnace consists of a first, stationary section and a second, transversely movable section.

DE 100 04 117 describes a furnace installation for heating continuously cast slabs and conveying them from a continuous casting installation to a rolling mill. Two furnace lines are provided, each of which follows a continuous casting line, and one of which is followed by a rolling line. Each furnace line contains a swiveling transverse conveyor, and the transverse conveyors can be swiveled relative to each other into a position in which they are aligned with each other.

In all of the previously known solutions, the material that is introduced, i.e., the metal strand, thus passes through a reheating furnace as part of the process line, whose primary functions, besides conveyance of the material, consist in heating, homogenizing, and maintaining the temperature of the reheated material.

One problem that is not dealt with in the solutions mentioned above is that scale formation on the material to be rolled produces problems that are not inconsiderable. The conveyance device for the material within the reheating furnace is preferably realized by the use of rollers or walking beams.

Depending on the reheated material that is used, on the process conditions, and on the design and material of the conveyance device, scale-related deposits form on the conveyance device over the course of time. These deposits consist mainly of components of the reheated material that is used. They damage the reheated material and cause defects on the finished product.

This is also recognized in EP 0 625 383 B1 and EP 0 846 508 B1, which describe finishing lines for strip and plate that have an installation for the continuous casting of thin or medium slabs. These are followed by a furnace and a downstream rolling train. To reduce scaling of the metal strand and its negative effects on the downstream processes, a descaling system is installed upstream of the furnace. The metal strand thus enters the furnace in a descaled, i.e., cleaned, state, thereby reducing the scale contamination of the furnace interior and especially the conveyance device.

Detailed studies have shown that these measures are not suitable for achieving an overall satisfactory result. Further scaling also takes place during the residence time of the metal strand in the furnace, so that considerable damage to the conveyance devices in the furnace over the course of time continues to be observed. In this regard, with increasing travel distance of the metal strand in the furnace, the scaling of the strand and thus the deposits in the furnace also increase, so that especially the downstream section of the furnace with respect to the direction of conveyance of the metal strand continues to experience a considerable burden of deposits. Accordingly, the effect of reoxidation of the reheated material in the course of its passage through the furnace, which leads to the aforementioned deposits, especially in the downstream section of the furnace, has not yet received due consideration.

Therefore, the objective of the invention is to create a method and a corresponding installation for producing metal strip, with which the above disadvantage can be avoided and with which it is possible to ensure that, especially in the downstream region of the furnace with respect to the direction of conveyance of the metal strip, scale deposits are avoided. This is intended to increase the operating life and service life of the installation.

In accordance with the invention, this objective is achieved by carrying out the descaling operation in the furnace in a moving location in the furnace.

Accordingly, the descaling system provided in the furnace region is intended to move relative to the furnace.

Moreover, this is to be understood to mean that a descaling operation is carried out within the furnace region itself. It is advantageous for this operation to be carried out more or less in the middle of the furnace region. The furnace extends a certain length in the direction of conveyance of the metal strand. This feature is to be understood to mean that the descaling operation is carried out at a point at which the metal strand has passed about halfway through the furnace. It is preferably carried out in the region of 40% to 60% of the longitudinal extent of the furnace.

In addition to the descaling operation in the region of the furnace, another descaling operation is preferably carried out upstream of the furnace with respect to the direction of conveyance of the metal strand. This means that the metal strand enters the furnace (region) descaled and is descaled again within the furnace or furnace region.

This prevents scale-related deposits in the furnace and especially on its conveyance elements or reduces these deposits to such an extent that the service life or operating life of the furnace and its components are significantly increased.

The installation for producing metal strip has a furnace, in which the metal strand can be brought to a desired temperature and/or maintained at a desired temperature, and a rolling train for rolling the metal strip downstream of the furnace in the direction of conveyance of the metal strip, and at least one descaling system is installed in the furnace. In accordance with the invention, the installation is characterized by the fact that the descaling system in the furnace is connected with moving devices, with which it can be moved in the direction of conveyance of the metal strand.

It is advantageous to install the descaling system more or less in the middle of the region of the furnace.

In this regard, it is possible to provide for the furnace to be continuous, i.e., for it to be constructed as a single section, as it were, and to install the descaling system in the interior of the furnace.

In addition to the descaling system in the region of the furnace, another descaling system is preferably installed upstream of the furnace.

In this regard, the descaling system is connected with moving devices, with which it can be moved in the direction of conveyance of the metal strand. In this way, the site of the descaling operation in the furnace region can be varied. In particular, the descaling system can be moved over the material to be descaled. Provision can be made to allow the descaling system to be moved out of the line.

Furthermore, it is also possible for the descaling to be assigned to a movable furnace section within the line. Movable furnace sections, for example, in the form of a transverse conveyor, are described in DE 40 17 928 A1.

The descaling is carried out with standard systems that are well known in themselves. In this regard, a type of descaling system with static nozzles or rotating nozzles can be used. It is also possible to use combinations of both types of nozzles. Detailed information on these types of nozzles is given in EP 0 625 383 B1.

The material to be descaled can be moved both forward (in the direction of conveyance) and backward (against the direction of conveyance) through or past the descaling system.

The proposal of the invention significantly prolongs the service life of the furnace installation and especially its device for conveying the metal strand, since the burden of scale deposits is significantly reduced.

In addition, the invention allows greater flexibility and productivity of the whole plant by reducing maintenance work and increasing slab quality.

Specific embodiments of the invention are illustrated in the drawings.

Figure 1:
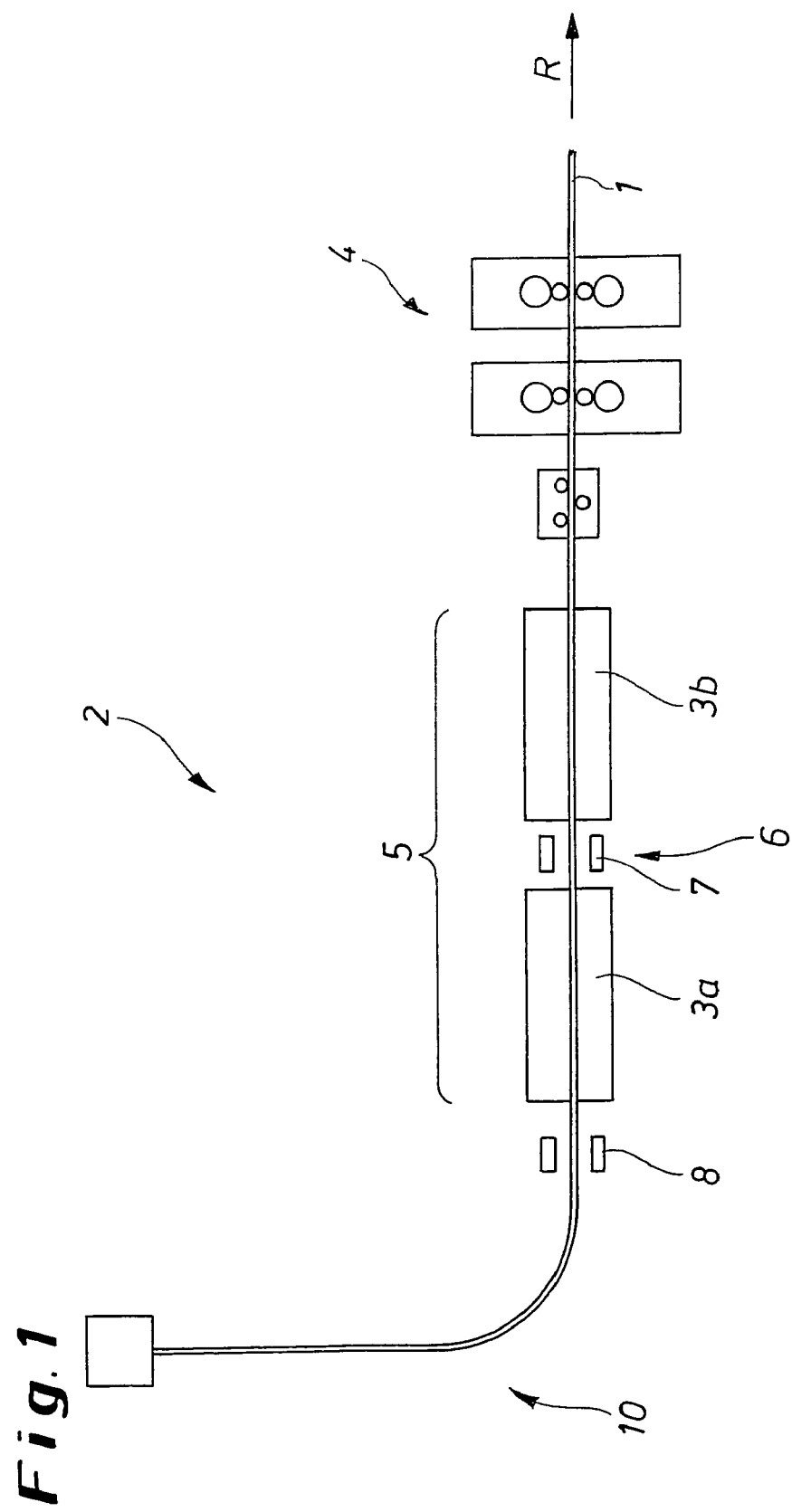
FIG. 1 is a schematic representation of an installation with a furnace for producing a metal strip.
Figure 2:
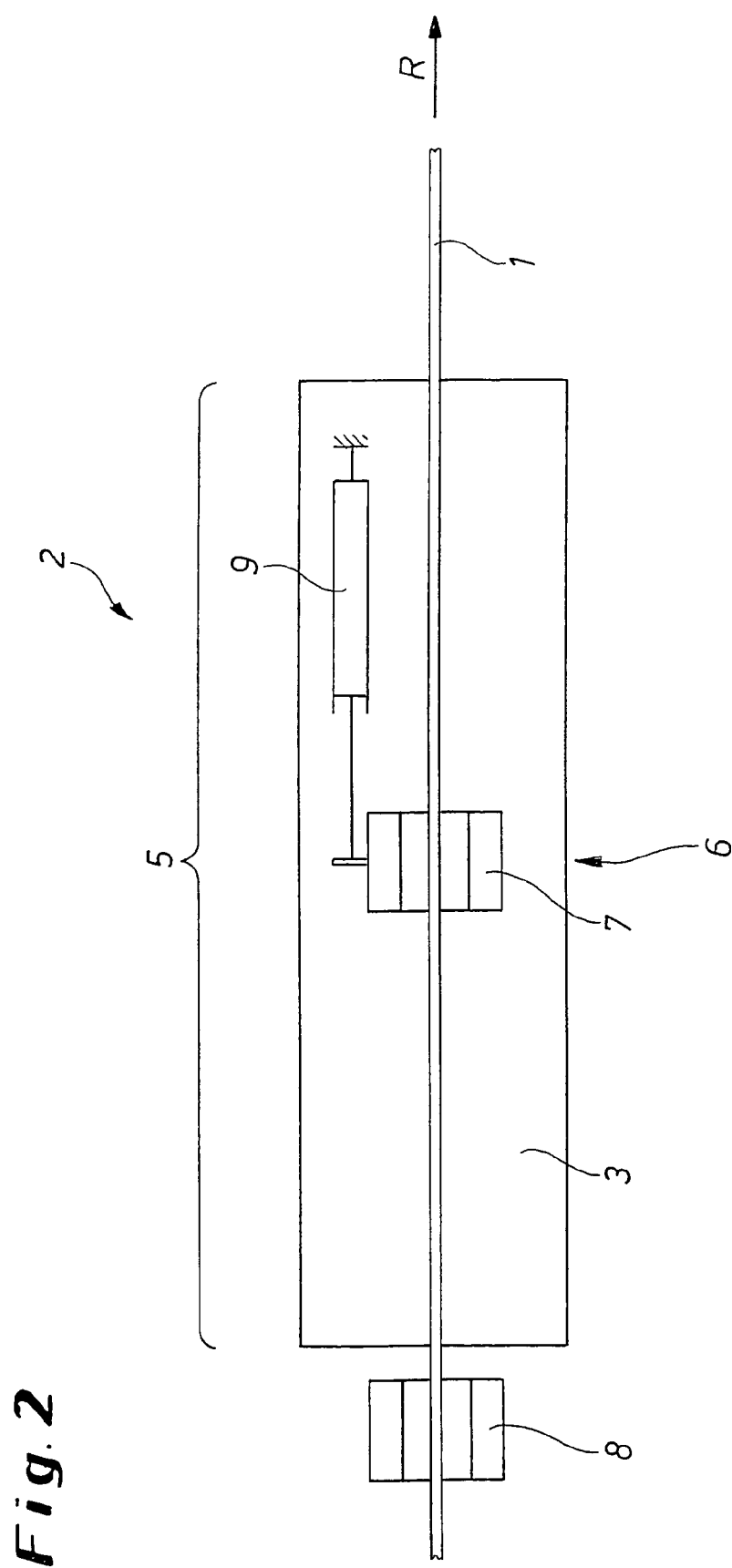
FIG. 2 is a schematic representation of the region of the furnace in an alternative embodiment.

FIGS. 1 and 2 show schematic drawings of an installation 2 for producing a metal strand 1 in the form of a steel strip or steel plate. The installation 2 has a continuous casting installation 10, which is used to cast a thin slab strand and is shown only in highly schematic form. Not shown in detail is the fact that the continuous casting installation 10 consists of a mold, which is followed by a strand guide, which deflects the metal strand 1 from the vertical orientation in which it leaves the mold into a horizontal orientation by means of bending rolls and driving devices.

A continuous furnace 3, 3a, 3b is located downstream of the continuous casting installation 10 in the direction of conveyance R and extends over a region 5, i.e., it has a certain longitudinal extent in the direction of conveyance R. The furnace is needed for reheating, for temperature homogenization, and/or for buffering slabs or thin slabs.

A rolling train 4 is positioned in a well-known way downstream of the furnace 3, 3a, 3b.

A suitably modified installation 2 can also be used to process roughed plate or strip.

As is apparent from FIG. 1, the furnace in this case consists of two sections 3a and 3b, which extend over the region 5 in the direction of conveyance R. The furnace thus has a point of interruption. This point of interruption is located approximately in the middle 6 of the region 5. A descaling system 7 is installed in this position.

This descaling system operates in a well-known way, e.g., with the use of water, and statically arranged or moving (rotating) nozzles can be used. Other types of descaling systems can also be used, e.g., those that use acid.

The process of reheating, temperature homogenization, and/or buffering slabs or thin slabs is thus briefly interrupted at point 6 for the purpose of carrying out an intermediate descaling in the furnace region 5.

Another descaling system 8 is installed upstream of the furnace 3, 3a, 3b. It ensures that descaled, i.e., cleaned, material enters the furnace. This descaling system 8 works together with the descaling system 7 to ensure that virtually no impurities are formed over the entire region 5 of the furnace due to scaling phenomena during the passage of the metal strand 1 through the furnace. This greatly reduces deposits, especially on the conveyance elements in the furnace, and thus significantly increases the service life of the installation.

FIG. 2 shows that the furnace 3 can also be designed with a single section, i.e., it has no point of interruption in this embodiment. In this case, the descaling system 7 is installed in the interior of the furnace. It ensures that the metal strand 1 is descaled approximately in the middle of the furnace length, at position 6.

In the case illustrated here, it is additionally provided that the descaling system 7 can be moved in the furnace 3. For this purpose, the descaling system 7 is connected with moving devices 9 (only schematically indicated), which are able to move the descaling system 7 in the direction of conveyance R. The descaling system 7 can thus be positioned in the optimum location, or the descaling can be carried out with a moving descaling system 7.

Provision can also be made for the descaling system 7 to be arranged on or in a moving furnace section. This usually involves the use of transverse conveyors that move the rolling stock.

LIST OF REFERENCE SYMBOLS 1 metal strip
2 installation for producing metal strip
3 furnace
3a first furnace section
3b second furnace section
4 rolling train
5 region of the furnace
6 middle of the furnace region
7 descaling system
8 descaling system
9 moving devices
10 continuous casting installation
R direction of conveyance

The invention claimed is:

1. Method for producing metal strip (1) in an installation (2), in which a metal strand, especially a thin slab, is brought to a desired temperature and/or is maintained at a desired temperature in a furnace (3, 3a, 3b) and is subjected to a rolling process in a rolling train (4) downstream of the furnace (3, 3a, 3b) in the direction of conveyance (R) of the metal strand (1), wherein the metal strand (1) is subjected to at least one descaling operation during its residence time in the furnace (3, 3a, 3b), wherein the descaling operation in the furnace (3, 3a, 3b) is carried out in a moving location in the furnace (3, 3a, 3b), and wherein the descaling operation is carried out by a descaling system located in the furnace and connected with moving devices for allowing the system to move in the direction of conveyance.

2. Method in accordance with claim 1, wherein a descaling operation is carried out approximately in the middle (6) of a region (5) of the furnace (3, 3a, 3b).

3. Method in accordance with claim 2, wherein, in addition to the descaling operation in the region (5) of the furnace (3, 3a, 3b), a descaling operation is carried out upstream of the furnace (3, 3a, 3b) with respect to the direction of conveyance (R) of the metal strand (1).

4. Installation (2) for producing metal strip (1), which has a furnace (3, 3a, 3b), in which a metal strand, especially a thin slab, can be brought to a desired temperature and/or maintained at a desired temperature, and a rolling train (4) for rolling the metal strand (1) downstream of the furnace (3, 3a, 3b) in the direction of conveyance (R) of the metal strip (1), wherein at least one descaling system (7) is installed in the furnace (3, 3a, 3b), wherein the descaling system (7) in the furnace (3, 3a, 3b) is connected with moving devices (9), with which it can be moved in the direction of conveyance (R) of the metal strand (1).

5. Installation in accordance with claim 4, wherein the descaling system (7) is installed more or less in the middle (6) of a region (5) of the furnace (3, 3a, 3b).

6. Installation in accordance with claim 5, wherein, in addition to the descaling system (7) in the region (5) of the furnace (3, 3a, 3b), a descaling system (8) is installed upstream of the furnace (3, 3a, 3b) with respect to the direction of conveyance (R) of the metal strand (1).

7. Installation in accordance with claim 4, wherein the furnace (3) is continuous, and the descaling system (7) is installed in the interior of the furnace.

8. Installation in accordance with claim 4, wherein the at least one descaling system systems (7, 8) is of the type with static nozzles.

9. Installation in accordance with claim 4, wherein the at least one descaling system systems (7, 8) is of the type with rotating nozzles.

* * * * *